(12) United States Patent
Kim (10) Patent No.: US 7,325,964 B2
(45) Date of Patent: Feb. 5, 2008

(54) BACKLIGHT ASSEMBLY AND LIQUID CRYSTAL DISPLAY APPARATUS HAVING THE SAME

(75) Inventor: Hee-Sun Kim, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 90 days.

(21) Appl. No.: 11/180,870

(22) Filed: Jul. 13, 2005

(65) Prior Publication Data

US 2006/0018131 A1    Jan. 26, 2006

(30) Foreign Application Priority Data

Jul. 21, 2004    (KR) ...................... 10-2004-0056822

(51) Int. Cl.
*F21V 7/04* (2006.01)
(52) U.S. Cl. .................. 362/634; 362/27; 362/260; 362/614
(58) Field of Classification Search ............. 362/27, 362/260, 614, 634; 439/226–244
See application file for complete search history.

(56) References Cited

U.S. PATENT DOCUMENTS 6,309,081 B1 * 10/2001 Furihata ..................... 362/634
6,572,236 B2 * 6/2003 Suzuki et al. ............... 362/600
6,905,224 B2 * 6/2005 Yoo et al. .................... 362/225
2002/0015297 A1 * 2/2002 Hayashi et al. .............. 362/27
2003/0123258 A1 * 7/2003 Nitto et al. .................. 362/373

FOREIGN PATENT DOCUMENTS

JP        05165027 A  *  6/1993

* cited by examiner

*Primary Examiner*—Sandra O'Shea
*Assistant Examiner*—Mary Zettl
(74) *Attorney, Agent, or Firm*—Cantor Colburn LLP (57) ABSTRACT

A backlight assembly includes a lamp, a light guide plate, a lamp holder, a lamp cover and a receiving container. The lamp generates light. The light guide plate guides the light generated from the lamp. The lamp holder holds an end portion of the lamp. The lamp holder includes an opening portion that exposes a portion of the lamp. The lamp cover receives the lamp holder holding the lamp and reflects the light generated from the lamp toward the light guide plate. The receiving container receives the light guide plate. Therefore, light-using efficiency is enhanced. Furthermore, a dark region displayed at edge portions of a conventional backlight assembly may be removed to enhance a display quality.

29 Claims, 7 Drawing Sheets

BACKLIGHT ASSEMBLY AND LIQUID CRYSTAL DISPLAY APPARATUS HAVING THE SAME

This application claims priority to Korean Patent Application No. 2004-56822 filed on Jul. 21, 2004 and all the benefits accruing therefrom under 35 U.S.C. § 119, the contents of which are herein incorporated by reference in its entirety.

BACKGROUND OF THE INVENTION

1. Field of the Invention

The present invention relates to a backlight assembly and a liquid crystal display apparatus having the backlight assembly. More particularly, the present invention relates to a backlight assembly capable of enhancing light-using efficiency and a liquid crystal display apparatus having the backlight assembly.

2. Description of the Related Art

A liquid crystal display ("LCD") apparatus is a type of flat type display apparatus. The LCD apparatus displays images by using liquid crystal. The LCD apparatus has many merits such as thin thickness, lightweight, low driving voltage, low power consumption, etc. Therefore, the LCD apparatus is used in various fields.

The LCD apparatus includes an LCD panel. The LCD panel includes a thin film transistor ("TFT") substrate, a color filter substrate facing the TFT substrate, and a liquid crystal layer interposed between the TFT substrate and the color filter substrate. When electric fields are generated between the TFT substrate and the color filter substrate, an optical transmittance of the liquid crystal layer is changed to display the images. The LCD panel does not emit light by itself. Therefore, the LCD panel requires a backlight assembly that provides the LCD panel with light.

The backlight assembly includes a lamp unit, a light guide plate and a receiving container. The lamp unit generates light. The light guide plate guides the light generated from the lamp unit toward the LCD panel. The receiving container receives the lamp unit and the light guide plate.

The lamp unit includes a lamp that generates light, lamp holders that hold end portions of the lamp, and a lamp cover that is combined with the lamp holder to cover the lamp. The lamp holders into which the lamp is inserted are combined with the lamp cover to support the lamp.

First and second end portions of the lamp are inserted into lamp holders, respectively. Effective light emitting portions of the lamp are blocked by the lamp holders, therefore light-using efficiency is lowered. Furthermore, regions of the LCD panel, which correspond to the first and second end portions of the lamp, are darker than a region of LCD panel corresponding to center portions of the lamp. Thus, the regions of the LCD panel corresponding to the first and second end portions of the lamp have a lower display quality due to the lamp holders.

When lengths of the lamp holders are reduced in order to remove the above-mentioned problems, the lamp holders hold the lamps in an unstable condition, so that the lamps are not fixed to lower luminance uniformity. Also, leakage current is increased because a distance between the lamp and the lamp cover is decreased.

SUMMARY OF THE INVENTION

The present invention provides a backlight assembly capable of enhancing light using efficiency and holding lamps in a stable condition.

The present invention also provides a liquid crystal display ("LCD") apparatus having the above-mentioned backlight assembly.

In one exemplary embodiment of a backlight assembly according to the present invention, the backlight assembly includes a lamp, a light guide plate, a lamp holder, a lamp cover and a receiving container. The lamp generates light. The light guide plate has a side face for receiving the light and guides the light generated from the lamp. The lamp holder holds an end portion of the lamp. The lamp holder includes an opening portion that exposes a portion of the lamp. The opening portion faces the side face of the light guide plate. The lamp cover receives the lamp holder holding the lamp and reflects the light generated from the lamp toward the light guide plate. The receiving container receives the light guide plate.

In one exemplary embodiment of an LCD apparatus according to the present invention, the LCD apparatus includes a backlight assembly, an LCD panel and an inverter. The backlight assembly includes a lamp, a light guide plate, a lamp holder, a lamp cover and a receiving container. The lamp generates light. The light guide plate has a side face for receiving the light and guides the light generated from the lamp. The lamp holder holds an end portion of the lamp. The lamp holder includes an opening portion that exposes a portion of the lamp. The opening portion faces the side face of the light guide plate. The lamp cover receives the lamp holder holding the lamp and reflects the light generated from the lamp toward the light guide plate. The receiving container receives the light guide plate. The LCD panel displays an image by using the light provided from the lamp. The inverter is disposed on a backside of the receiving container. The inverter applies driving voltages to the lamp.

In one exemplary embodiment of a lamp unit for a backlight assembly, the lamp unit includes a first lamp holder for holding a first end portion of a lamp, the first lamp holder having a first end, a second end, a first side surface extending between the first end and the second end, an insertion hole extending from the first end inwardly into the first lamp holder, the insertion hole sized for receiving the first end portion of the lamp, and an opening portion extending from the insertion hole to the first side surface.

The lamp holder as described herein includes the opening portion that enhances light-using efficiency, while receiving the lamp in a stable condition. Furthermore, a dark region displayed at edge portions of a conventional backlight assembly may be removed to enhance a display quality.

BRIEF DESCRIPTION OF THE DRAWINGS

The above and other features and advantages of the present invention will become more apparent by describing in detailed exemplary embodiments thereof with reference to the accompanying drawings, in which.

DETAILED DESCRIPTION OF THE INVENTION

Hereinafter, the embodiments of the present invention will be described in detail with reference to the accompanied drawings.

In the drawings, the thickness of layers, films, and regions are exaggerated for clarity. Like numerals refer to like elements throughout. It will be understood that when an element such as a layer, film, region, or substrate is referred to as being "on" another element, it can be directly on the other element or intervening elements may also be present.

Figure 1:
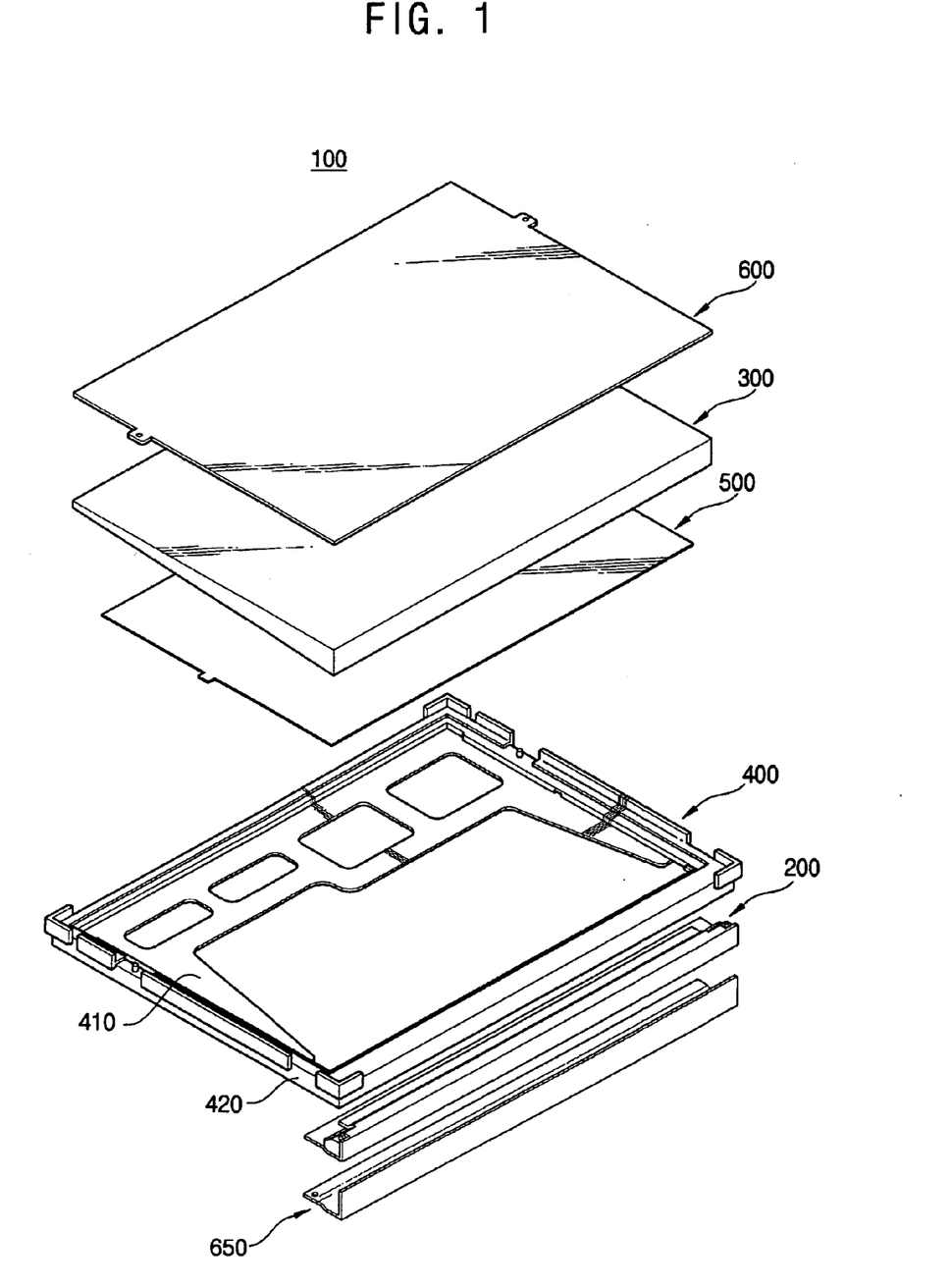
FIG. 1 is an exploded perspective view illustrating an exemplary embodiment of a backlight assembly according to the present invention.
Figure 2:
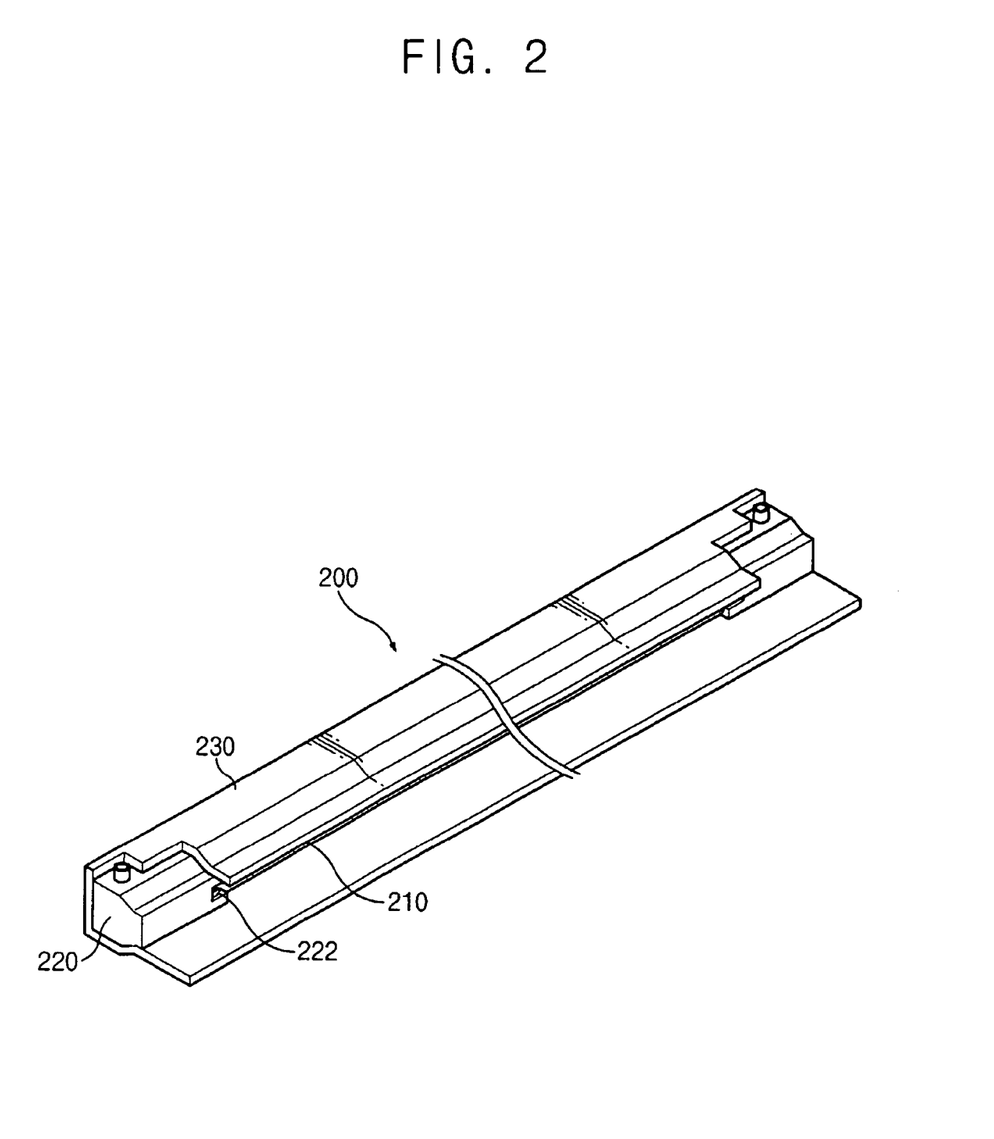
FIG. 2 is a perspective view illustrating a lamp unit in FIG. 1.

FIG. 1 is an exploded perspective view illustrating an exemplary embodiment of a backlight assembly according to the present invention, and FIG. 2 is a perspective view illustrating a lamp unit in FIG. 1.

Referring to FIG. 1, a backlight assembly 100 includes a lamp unit 200 that generates light, a light guide plate 300 that guides the light generated from the lamp unit 200, and a receiving container 400 that receives the lamp unit 200 and the light guide plate 300.

The lamp unit 200 includes a lamp 210 that generates light, lamp holders 220 for holding end portions of the lamp 210, and a lamp cover 230 that receives the lamp 210 and the lamp holders 220. The lamp holders 220 may include a first lamp holder for holding a first end portion of the lamp 210 and a second lamp holder for holding a second end portion of the lamp 210. The lamp unit 200 is disposed at a side portion of the light guide plate 300 such that light from the lamp 210 is received by a light incidence side face of the light guide plate 300. The receiving container 400 receives the light guide plate 300 and the lamp unit 200 disposed at the side portion of the light guide plate 300.

A cold cathode fluorescent lamp ("CCFL") may be employed as the lamp 210, although other types of lamps 210 are within the scope of the lamp unit 200. When a driving voltage is applied to the lamp 210, the lamp generates light.

First and second end portions of the lamp 210 are combined with the first and second lamp holders 220, respectively. The lamp holders 220 combined with the lamp 210 are combined with the lamp cover 230 to fix the lamp 210 within the lamp cover 230.

Each of the lamp holders 220 has an opening portion 222. A portion of the lamp holders 220, which face the light incidence side face of the light guide plate 300, is removed to form the opening portion 222. The opening portion 222 exposes sections of the first and second end portions of the lamp 210 to the side face of the light guide plate 300.

The lamp cover 230 is combined with the lamp holders 220. Each lamp holder 220 includes a first end for receiving the lamp 210 and a second end. The first end of the first lamp holder 220 faces the first end of the second lamp holder 220. The lamp cover 230 covers and protects the lamp 210. The lamp cover 230 may include a generally U-shaped or channel-shaped cross-section and may extend generally from the second end of the first lamp holder 220 to the second end of the second lamp holder 220. The lamp 210, as well as the lamp holders 220, may be positioned within an interior of the lamp cover 230. The lamp cover 230 may include a material having good optical reflectivity. The lamp cover 230 may also include a light reflecting layer formed thereon, particularly within the interior of the lamp cover 230. The lamp cover 230 reflects light generated from the lamp 210 towards the light incidence side face of the light guide plate 300 to enhance light-using efficiency. The light guide plate 300 is combined with the lamp cover 230 such that light generated from the lamp 210 may enter the light guide plate 300 through the side face of the light guide plate 300. A side face of the lamp holder 220 makes contact with the light guide plate 300 to prevent the light guide plate 300 from being over inserted into the lamp cover 230. Therefore, the lamp holder 220 protects the lamp 210 from the light guide plate 300.

The receiving container 400 contains the light guide plate 300. The light guide plate 300 changes paths of light generated from the lamp unit 200. That is, light generated from the lamp unit 200 enters the light guide plate 300 through the side face and exits the light guide plate 300 through an upper face, where the side face faces the lamp 210 and the upper face faces a display unit. The light guide plate 300 may have printed patterns or prism patterns formed on a lower face of the light guide plate 300, where the lower face faces a bottom portion of the receiving container 400. The light guide plate 300 has, for example, a wedge-shape, wherein a thickness of the light guide plate 300 decreases along a direction from a side face facing the lamp 210 to an opposite side face. When the light guide plate 300 has the wedge-shape, weight and thickness of the backlight assembly 100 decrease.

The receiving container 400 includes a bottom portion 410 and side portions 420 extended from edges of the bottom portion 410 to define a receiving space. The bottom portion 410 of the receiving container 400 may include openings for reducing weight. That is, the bottom portion 410 may have minimum surface area for supporting the light guide plate 300.

The receiving container 400 receives the light guide plate 300 and the lamp unit 200. For example, the light guide plate 300 may be downwardly received on the bottom portion 410 of the receiving container 400, and the lamp unit 200 may be upwardly received.

The backlight assembly 100 further includes a light reflecting sheet 500 disposed under the light guide plate 300 and between a lower face of the light guide plate 300 and the bottom portion 410, and a light-condensing sheet 600 disposed on an upper face of the light guide plate 300.

The light-reflecting sheet 500 reflects light that is leaked from the light guide plate 300 back towards the light guide plate 300. The light-reflecting sheet 500 may include, for example, polyethylene terephthalate ("PET"), polycarbonate ("PC"), etc.

The light-condensing sheet 600 is disposed on the upper face of the light guide plate 300 in order to enhance luminance. The light-condensing sheet 600 includes prism patterns that condense light. The prism patterns may also be formed on the upper face or the lower face of the light guide plate 300.

The backlight assembly 100 may further include a light-diffusing sheet (not shown). The light-diffusing sheet may be disposed on an upper or lower face of the light-condensing sheet 600. The light-diffusing sheet diffuses light to enhance luminance uniformity. The backlight assembly 100 may alternatively exclude the above-mentioned sheet. The backlight assembly 100 may further include other types of optical sheets for enhancing optical characteristics.

The backlight assembly 100 may further include a back cover 650. The back cover 650 emits heat generated from the lamp 210. The back cover 650 is combined with the receiving container 400 such that the back cover 650 makes contact with a lower exterior face of the lamp cover 230. Therefore, the back cover 650 prevents the lamp unit 200 from drifting relative to the receiving container 400 and emits heat transferred from the lamp cover 230. Preferably, the back cover 650 may include metal having good thermal conductivity.

Figure 3:
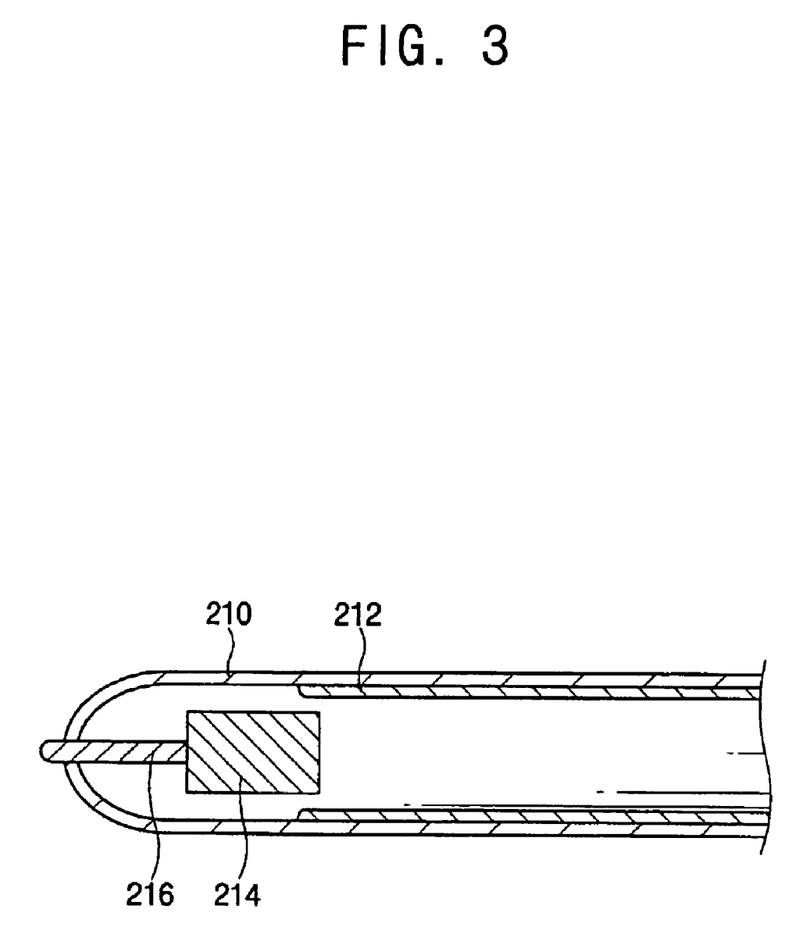
FIG. 3 is a side cross-sectional view illustrating a portion of a lamp in FIG. 2.

FIG. 3 is a cross-sectional view illustrating the lamp 210 in FIG. 2.

Referring to FIG. 3, the lamp 210 includes a fluorescent layer 212 formed on an inner face of the lamp 210 and internal electrodes 214 are disposed within end portions of the lamp 210. Two internal electrodes 214 are disposed within first and second end portions of the lamp 210, respectively.

The fluorescent layer 212 covers an interior surface of the lamp except for interior regions corresponding to the first and second end portions of the lamp 210. The lamp 210 emits light through a region having a fluorescent layer formed thereon. The internal electrodes 214 are disposed inside the lamp 210. The internal electrodes 214 are electrically connected to the conducting portion 216. A portion of the conducing portion 216 is exposed outside the lamp 210, for electrically connecting the conducting portion 216 to a lamp wire (not shown).

When a driving voltage is applied to the internal electrodes 214 through the lamp wire and the conducting portion 216, one of the internal electrodes 214 emits electrons. The emitted electrons excite mercury disposed in the lamp 210 to generate ultraviolet light. The ultraviolet light is converted into visible light by the fluorescent layer 212. The driving voltage may be supplied to the lamp 210 by an inverter disposed on a backside of the receiving container 400.

Figure 4:
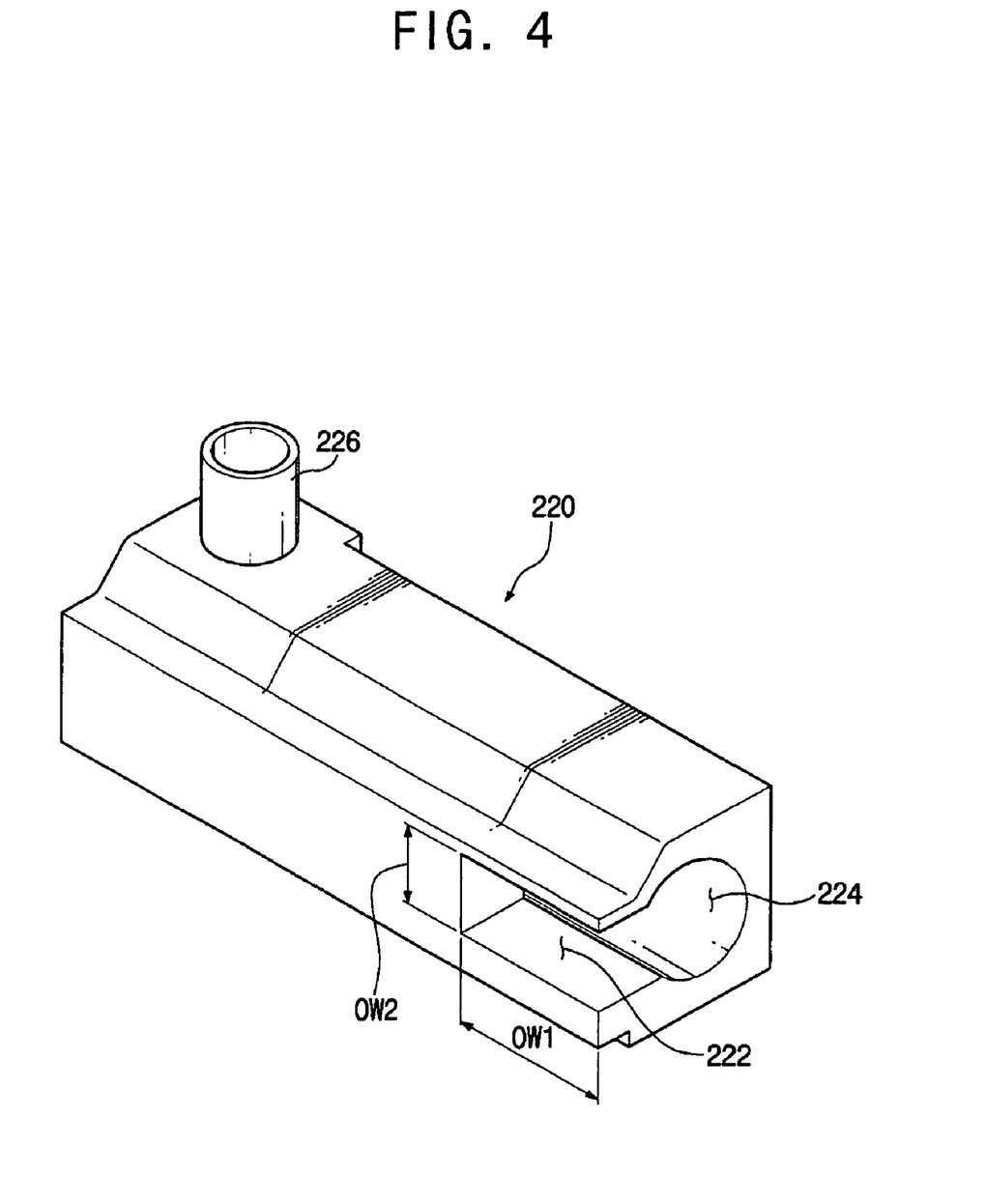
FIG. 4 is a perspective view illustrating a lamp holder in FIG. 2.
Figure 5:
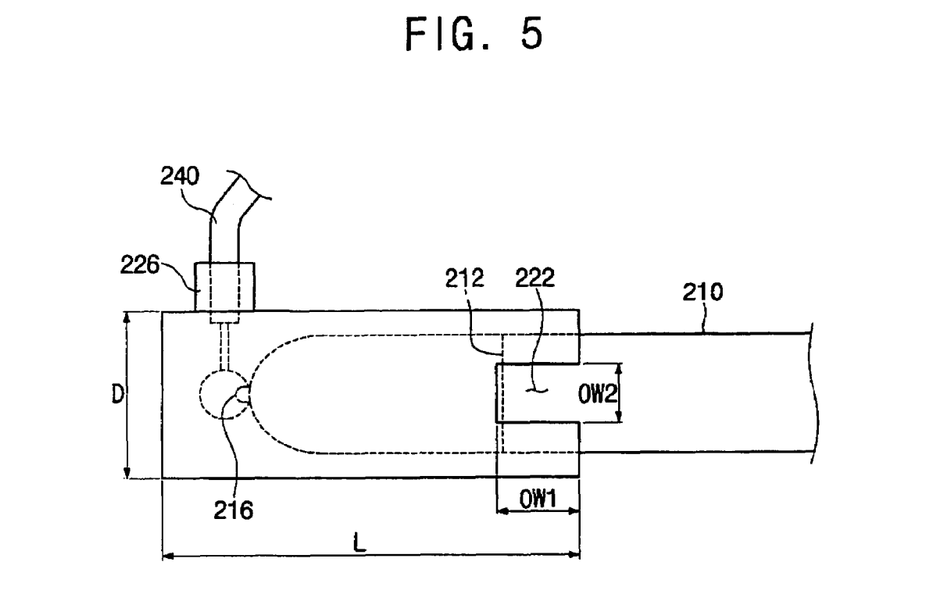
FIG. 5 is a side plan view illustrating a combination of a lamp and a lamp holder in FIG. 2.

FIG. 4 is a perspective view illustrating the lamp holder 220 in FIG. 2, and FIG. 5 is a plan view illustrating a combination of the lamp 210 and the lamp holder 220 in FIG. 2.

Referring to FIGS. 4 and 5, the lamp holder 220 includes an insertion hole 224 and an opening portion 222. The insertion hole 224 extends inwardly into the lamp holder 220 from the first end of the lamp holder 220. The insertion hole 224 may share a longitudinal axis with the longitudinal axis of the lamp 210. The insertion hole 224 is sized for accepting the end portion of the lamp 210 and the lamp 210 is inserted into the lamp holder 220 through the insertion hole 224. The opening portion 222 exposes a portion of the lamp 210. The lamp holder 220 includes a dielectric material. The lamp holder 220 includes, for example, rubber.

The opening portion 222 is formed within a face that faces the light incident side face of the light guide plate 300. The opening portion 222 extends from the first end of the lamp holder 220, but does not extend the full length of the insertion hole 224. The entire length of the opening portion 222 may be opened to the insertion hole 224. The opening portion 222 is formed at a region corresponding to the fluorescent layer 212. When a size of the opening portion 222 increases, a light-using efficiency also increases but the lamp 210 may be separated easily from the lamp holder 220. Preferably, the opening portion 222 exposes only a region corresponding to the fluorescent layer 212. That is, the portion of the lamp 210 that does not include the fluorescent layer therein, such as the endmost portions of the end portions of the lamp 210, need not be made visibly accessible through the opening portion 222.

The opening portion 222 has a first width OW1 along a longitudinal direction of the lamp 210 (measured parallel to a longitudinal axis of the insertion hole 224), and a second width OW2 along a direction that is substantially perpendicular to the longitudinal direction of the lamp 210 (measured substantially perpendicular to the longitudinal axis of the insertion hole 224). The first width OW1 is sufficient for exposing the fluorescent layer 212. That is, the first width OW1 is large enough for the opening portion 222 to expose an end portion of the fluorescent layer 212. When the second width OW2 increases, an amount of the visible light entering the light guide plate 300 increases. However, when the second width OW2 is greater than a diameter of the lamp 210, the lamp 210 may become inadvertently separated from the Is lamp holder 220. Therefore, the second width OW2 of the lamp holder 220 is smaller than the diameter of the lamp 210. In exemplary embodiments of the lamp holder 220, the second width OW2 is in a range within about 10% to about 90% of the diameter of the lamp 210. As an example, the second width OW2 is in a range within about 0.4 mm to about 1.8 mm.

In one exemplary embodiment of a lamp 210 and lamp holder 220 combination, the diameter of the lamp 210 is about 2 mm, a length 'L' of the lamp holder 220 is about 8 mm, and a thickness 'D' of the lamp holder 220 is about 3 mm. The lamp 210 is inserted into the lamp holder 220 by about 6.5 mm. The first width OW1 is about 2 mm, and the second width OW2 is about 1.2 mm.

The lamp holder 220 may further include a wire-fixing portion 226 that fixes the lamp wire 240 relative to the lamp holder 220 and lamp 210. The lamp wire 240 is inserted into the lamp holder 220 through the wire-fixing portion 226 to be electrically connected to the conducting portion 216 such as by soldering.

Figure 6:
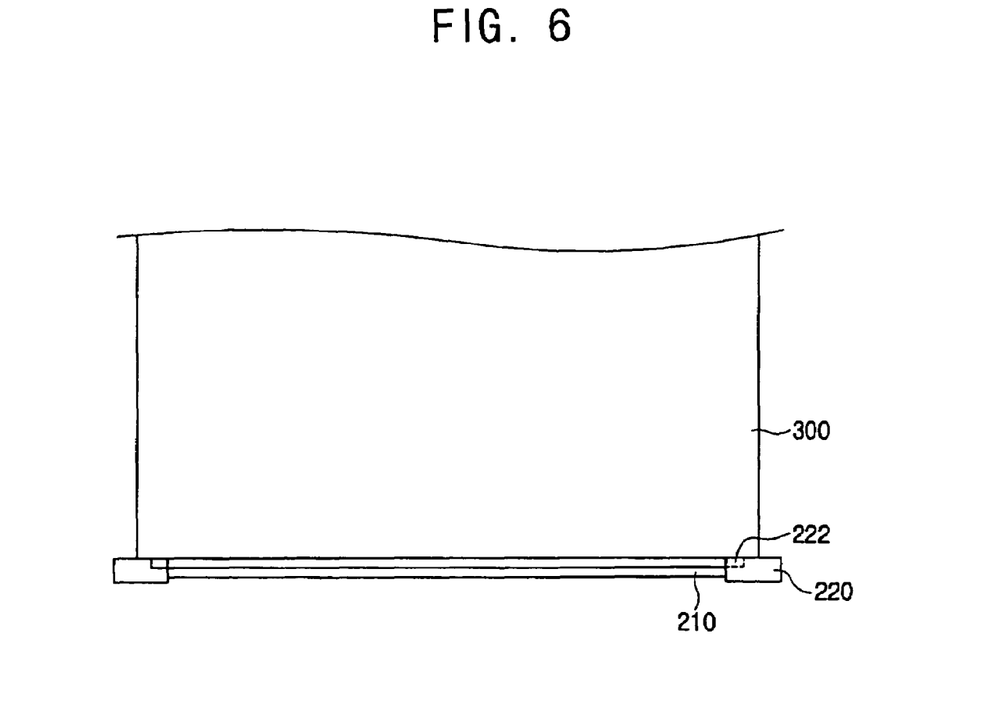
FIG. 6 is a top plan view illustrating a lamp unit and a light guide plate in FIG. 1.

FIG. 6 is a top plan view illustrating a lamp unit 200 and a light guide plate 300 in FIG. 1.

Referring to FIG. 6, the lamp 210 combined with the lamp holder 220 is disposed at a light incident side face of the light guide plate 300. The side of the light guide plate 300 makes contact with the lamp holder 220. Therefore, the lamp holder 220 prevents the light guide plate 300 from moving towards and potentially abutting the lamp 210 thereby protecting the lamp 210.

The lamp holder 220 is disposed at the side of the light guide plate 300 such that the opening portion 222 of the lamp holder 220 faces the light entering side face of the light guide plate 300. The opening portion 222 of the lamp holder 220 exposes the lamp 210 to increase an amount of light advanced toward the side face of the light guide plate 300. That is, light that exits through a portion of the lamp 210, which is inserted into the lamp holder 220, may enter the light guide plate 300, so that dark regions, which are displayed at corners of a conventional backlight assembly, may be removed.

Figure 7:
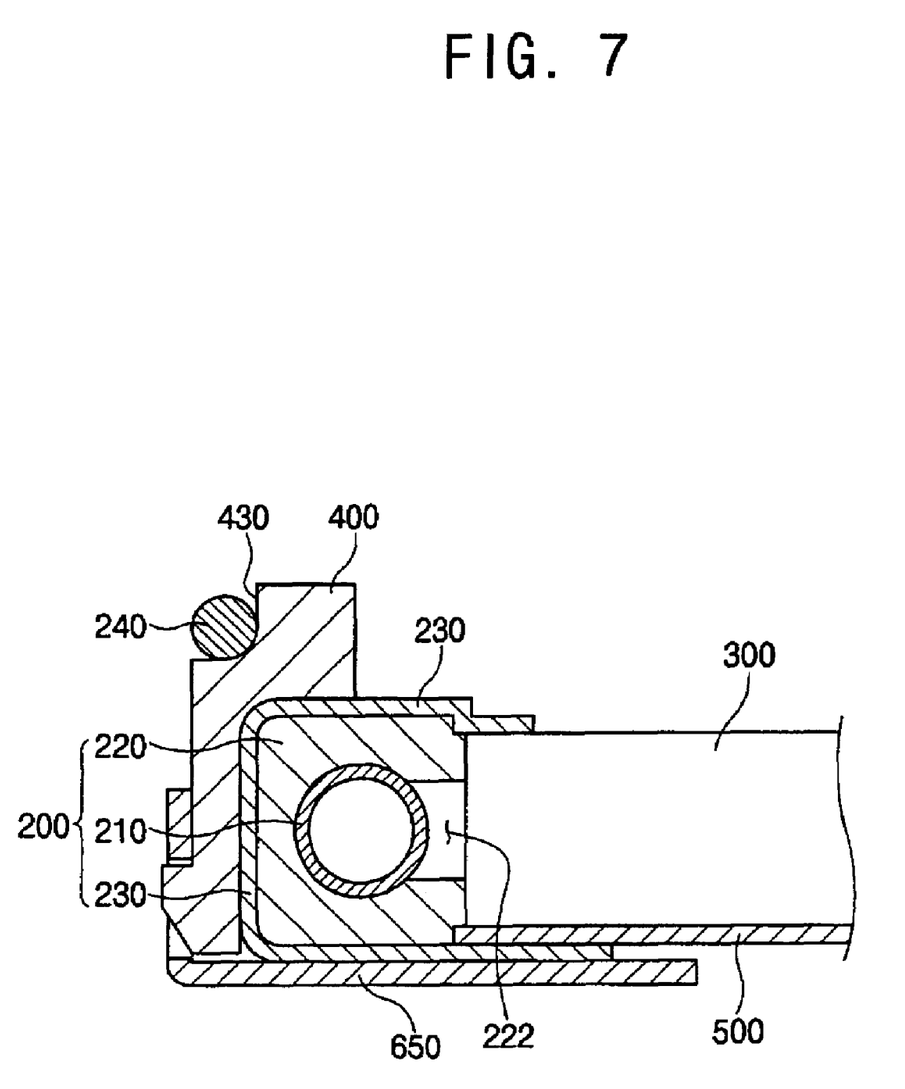
FIG. 7 is a side cross-sectional view illustrating a portion of the backlight assembly in FIG. 1.

FIG. 7 is a cross-sectional view illustrating a portion of the backlight assembly 100 in FIG. 1.

Referring to FIG. 7, the lamp unit 200 moves upwardly for receipt by the receiving container 400 during an assembly of the backlight assembly 100. The lamp unit 200 is disposed at a side portion of the receiving container 400. The light reflecting sheet 500 and the light guide plate 300 move downwardly to be received by the receiving container 400 in sequence. The light guide plate 300 is inserted into the lamp cover 230 to be combined with the lamp unit 200. The lamp cover 230 covers all portions of the lamp 210 except for a portion of the lamp 210 facing the light guide plate 300. Therefore, all portions of light from the lamp 210 may advance towards the light guide plate 300 due to the lamp cover 230. Furthermore, light generated from a portion of the lamp 210 inserted into the lamp holder 220 may also enter the light guide plate 300 through the opening portion 222 of the lamp holder 220.

The back cover 650 is combined with a side portion of the receiving container 400, for example, by a hook combination such that the back cover 650 makes contact with the lower exterior face of the lamp cover 230. The back cover 650 fixes the lamp unit 200 to the receiving container 400 and emits heat generated from the lamp 210 of the lamp unit 200.

The receiving container 400 includes a stepped portion 430 that guides the lamp wire 240.

Figure 8:
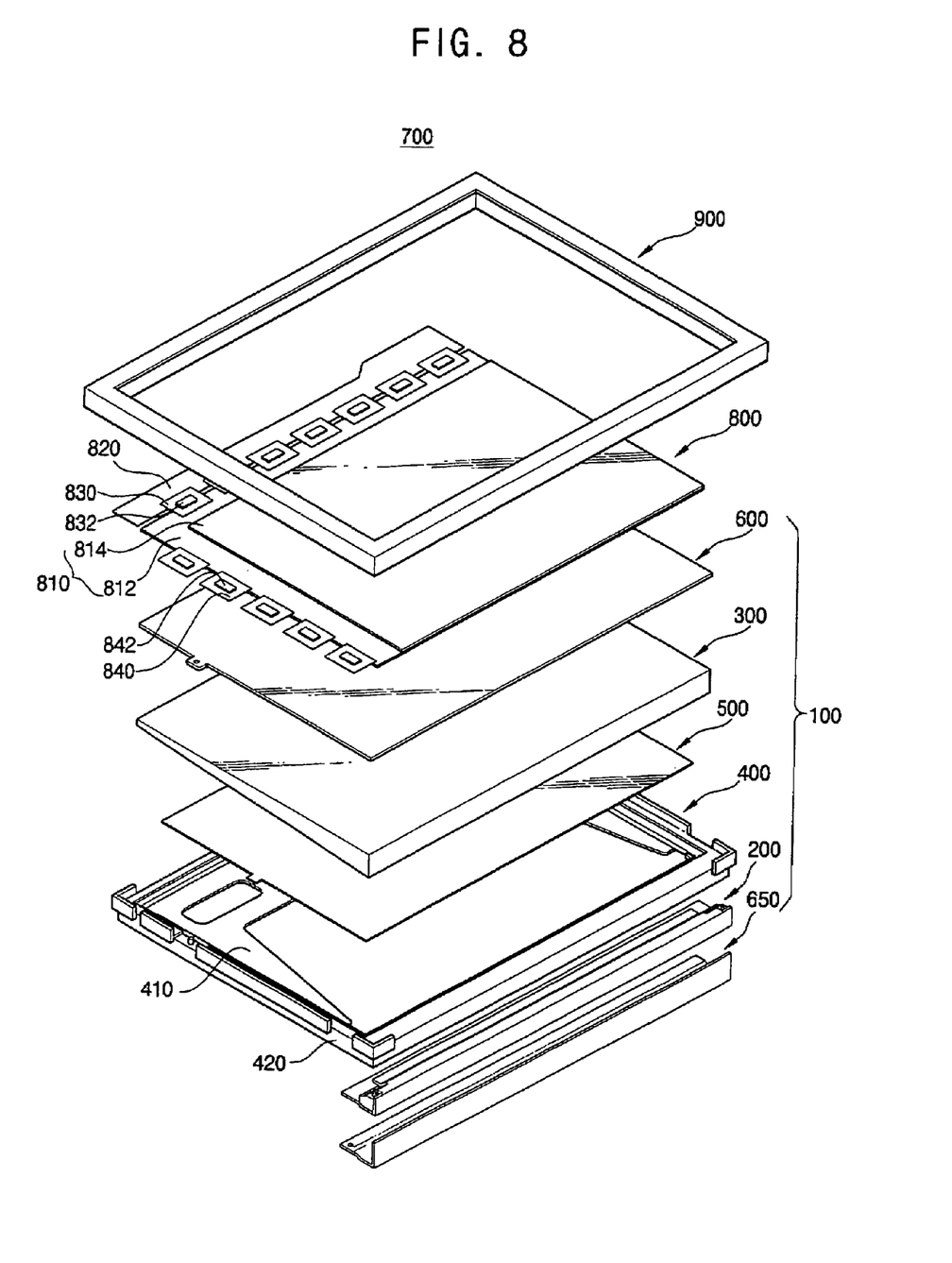
FIG. 8 is an exploded perspective view illustrating an exemplary embodiment of a liquid crystal display apparatus according to the present invention.

FIG. 8 is an exploded perspective view illustrating an exemplary embodiment of a liquid crystal display ("LCD") apparatus according to the present invention. The LCD apparatus 700 employs the backlight assembly 100 described above. Therefore, the same reference numerals will be used to refer to the same or like parts as those disclosed in FIGS. 1 to 7, and any further explanation will be omitted.

Referring to FIG. 8, an LCD apparatus 700 includes a backlight assembly 100 that generates light, an inverter disposed on a backside of the backlight assembly 100 for applying driving voltages to the lamp 210 within the backlight assembly 100, a display unit 800 that displays an image by using the light, and a fixing member 900 that fixes the display unit 800 to the backlight assembly 100.

The display unit 800 includes an LCD panel 810 that displays an image by using the light provided from the backlight assembly 100, and a source printed circuit board ("PCB") 820 for driving the LCD panel 810.

Driving signals outputted from the source PCB 820 a reapplied to the LCD panel 810 through data and gate flexible printed circuits ("FPCs") 830 and 840.

The data and gate FPCs 830 and 840 may correspond to tape carrier package ("TCP") or chip on film ("COF").

The data and gate FPCs 830 and 840 include data and gate driver chips 832, 842, respectively. The data and gate driver chips 832, 842 apply the driving signals to LCD panel 810 at proper times.

The LCD panel 810 includes a thin film transistor ("TFT") substrate 812, a color filter substrate 814 facing the TFT substrate 812 and a liquid crystal layer (not shown) interposed between the TFT substrate 812 and the color filter substrate 814.

The TFT substrate 812 includes a glass substrate having a plurality of TFTs formed thereon. The TFTs are arranged in a matrix shape. Each of the TFTs includes a source electrode that is electrically connected to one of the source lines therein, a gate electrode that is electrically connected to one of the gate lines therein, and a drain electrode that is electrically connected to a pixel electrode. The pixel electrode includes an optically transparent and electrically conductive material such as ITO, IZO, etc.

The color filter substrate 814 includes a glass substrate having red, green and blue color filters formed thereon. The color filter substrate 814 also includes a common electrode including an optically transparent and electrically conductive material such as ITO, IZO, etc.

When a gate voltage is applied to the gate electrode of the TFT, the TFT is turned on, so that a pixel voltage is applied to the pixel electrode through the TFT. Therefore, electric fields are formed between the pixel electrode of the TFT substrate 812 and the common electrode of the color filter substrate 814.

When electric fields are applied to the liquid crystal layer between the pixel electrode and the common electrode, molecules of the liquid crystal layer are rearranged to convert optical transmittance to display black and white images. The black and white images are then converted into color images by the color filters of the color filter substrate 814.

The source PCB 820 is connected to an edge portion of the TFT substrate 812 through the data FPC 830. The source PCB 820 outputs a data driving signal and a gate-driving signal for driving the LCD panel 810. The data-driving signal for controlling the data lines formed on the TFT substrate 812 is applied to the data lines through the data FPC 830. The gate-driving signal for controlling the gate lines formed on the TFT substrate 812 is applied to the data lines through the data FPC 830 and the gate FPC 840. The TFT substrate 812 further includes wirings (not shown) that electrically connect the data FPC 830 to the gate FPC 840.

The display unit 800 is disposed on the backlight assembly 100. The LCD panel 810 is disposed on the receiving container 400. The receiving container 400 may further include a guiding portion formed at four edges of the receiving container 400. The guiding portion guides the LCD panel 810 therein. The data FPC 830 is bent when the display unit 800 is disposed on the backlight assembly 800, so that the source PCB 820 is disposed under the receiving container 400. That is, the source PCB 820 is disposed on a backside of the receiving container 400.

The fixing member 900 surrounds edge portions of the LCD panel 810 and is combined with the receiving container 400 to fix the LCD panel 810 to the backlight assembly 100. The fixing member 900 protects the LCD panel 810 and prevents the LCD panel 810 from drifting relative to the backlight assembly 100.

According to the present invention, the lamp holder 220 that holds the lamp 210 includes the opening portion 222 that enhances light-using efficiency, while receiving the lamp 210 in a stable condition. Furthermore, a dark region displayed at edge portions of a conventional backlight assembly may be removed to enhance a display quality.

Having described the exemplary embodiments of the present invention and its advantages, it is noted that various changes, substitutions and alterations can be made herein without departing from the spirit and scope of the invention as defined by appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A backlight assembly comprising:
   a lamp that generates light;
   a light guide plate that guides the light generated from the lamp, the light guide plate having a side face for receiving the light;
   a lamp holder disposed at only an end portion of the lamp and holds only the end portion of the lamp, the lamp holder including an opening portion that exposes a portion of the end portion of the lamp, the opening portion facing the side face of the light guide plate;
   a lamp cover that receives the lamp holder holding the lamp and reflects the light generated from the lamp toward the light guide plate; and
   a receiving container that receives the light guide plate.

2. The backlight assembly of claim 1, wherein the lamp emits the light through a region having a fluorescent layer formed thereon.

3. The backlight assembly of claim 1, wherein the lamp comprises a fluorescent layer formed on inner faces of the lamp.

4. The backlight assembly of claim 3, wherein the opening portion of the lamp holder exposes the region having the fluorescent layer formed therein.

5. The backlight assembly of claim 3, wherein the opening portion has a first width along a longitudinal direction of the lamp, and a second width along a direction that is substantially perpendicular to the longitudinal direction of the lamp.

6. The backlight assembly of claim 5, wherein the second width of the opening portion is smaller than a diameter of the lamp.

7. The backlight assembly of claim 5, wherein a portion of the first width of the opening portion exposes an end portion of the fluorescent layer.

8. The backlight assembly of claim 7, wherein the second width is about 10% to about 90% of the diameter of the lamp.

9. The backlight assembly of claim 7, wherein the second width is within a range from about 0.4 mm to about 1.8 mm.

10. The backlight assembly of claim 5, wherein the lamp has a diameter of about 2 mm, the first width is about 2 mm, and the second width is about 1.2 mm.

11. The backlight assembly of claim 1, wherein the light guide plate has a thickness decreasing along a direction from the side face facing the lamp to an opposite face of the side face.

12. The backlight assembly of claim 1, further comprising:
a light reflecting sheet disposed adjacent a first surface of the light guide plate; and
a light-condensing sheet disposed adjacent a second surface of the light guide plate.

13. The backlight assembly of claim 1, further comprising a back cover that is combined with the receiving container such that the back cover makes contact with the lamp cover to emit heat generated from the lamp.

14. A display apparatus comprising:
a backlight assembly including:
a lamp that generates light;
a light guide plate that guides the light generated from the lamp, the light guide plate having a side face for receiving the light;
a lamp holder disposed at only an end portion of the lamp and holds only the end portion of the lamp, the lamp holder including an opening portion that exposes a portion of the end portion of the lamp, the opening portion facing the side face of the light guide plate;
a lamp cover that receives the lamp holder holding the lamp and reflects the light generated from the lamp toward the light guide plate; and
a receiving container that receives the light guide plate;
a liquid crystal display panel that displays an image by using the light provided from the lamp; and
an inverter disposed on a backside of the receiving container, the inverter applying driving voltages to the lamp.

15. The display apparatus of claim 14, wherein the lamp emits the light through a region having a fluorescent layer formed thereon.

16. The display apparatus of claim 15, wherein the opening portion of the lamp holder exposes the region having the fluorescent layer formed thereon.

17. The display apparatus of claim 15, wherein the opening portion has a first width along a longitudinal direction of the lamp, and a second width along a direction that is substantially perpendicular to the longitudinal direction of the lamp.

18. The display apparatus of claim 17, wherein a portion of the first width of the opening portion exposes an end portion of the fluorescent layer.

19. The display apparatus of claim 17, wherein the second width of the opening portion is smaller than a diameter of the lamp.

20. The display apparatus of claim 19, wherein the second width is about 10% to about 90% of the diameter of the lamp.

21. The display apparatus of claim 14, wherein the backlight assembly further comprises:
a light reflecting sheet disposed adjacent a first surface of the light guide plate; and
a light-condensing sheet disposed adjacent a second surface of the light guide plate.

22. The display apparatus of claim 14, further comprising a fixing member that fixes the liquid crystal display panel to the backlight assembly.

23. A lamp unit for a backlight assembly, the lamp unit comprising:
a first lamp holder configured to be disposed at only a first end portion of a lamp and holding only the first end portion of the lamp, the first lamp holder having a first end, a second end, a first side surface extending between the first end and the second end, an insertion hole extending from the first end inwardly into the first lamp holder, the insertion hole sized for receiving the first end portion of the lamp, and an opening portion extending from the insertion hole to the first side surface,
wherein the opening portion of the first lamp holder has a first width and the first width of the opening portion is less than a length of the insertion hole.

24. The lamp unit of claim 23, further comprising a lamp, the first end portion of the lamp positioned within the insertion hole, the opening portion of the first lamp holder having the first width measured parallel to a longitudinal axis of the lamp and a second width measured substantially perpendicular to the longitudinal axis of the lamp, wherein the second width is less than a diameter of the lamp.

25. The lamp unit of claim 24, wherein the opening portion extends from the first end of the first lamp holder.

26. The lamp unit of claim 23, further comprising a lamp cover, the lamp cover having a substantially channel shaped cross-section surrounding a top surface, a bottom surface, and a second side surface of the first lamp holder, wherein the first side surface of the first lamp holder remains exposed.

27. The lamp unit of claim 26, further comprising a lamp having a first end portion and a second end portion, and further comprising a second lamp holder having a first end and a second end, wherein the second end portion of the lamp is inserted within the first end of the second lamp holder, and wherein the lamp cover extends at least from a first end of the first lamp holder to a first end of the second lamp holder.

28. The lamp unit of claim 27, wherein the lamp cover extends from a second end of the first lamp holder to a second end of the second lamp holder, and wherein the lamp cover includes a reflective coating on an interior surface of the lamp cover.

29. The lamp unit of claim 23, further comprising a lamp, the first end portion of the lamp positioned within the insertion hole, the lamp having a fluorescent layer, the opening portion of the first lamp holder extending from the first end of the first lamp holder to a region corresponding to an end of the fluorescent layer of the lamp.

* * * * *